US008537158B2

(12) United States Patent
Gong

(10) Patent No.: US 8,537,158 B2
(45) Date of Patent: Sep. 17, 2013

(54) PARALLEL TRIANGLE TESSELLATION

(75) Inventor: Minmin Gong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 12/629,623

(22) Filed: Dec. 2, 2009

(65) Prior Publication Data

US 2011/0128285 A1    Jun. 2, 2011

(51) Int. Cl.
*G06T 15/00* (2011.01)
(52) U.S. Cl.
USPC ............ 345/423; 345/419; 345/426; 345/428
(58) Field of Classification Search
USPC .................................. 345/419, 423, 426, 428
See application file for complete search history.

(56) References Cited

U.S. PATENT DOCUMENTS

| | | | |
|---|---|---|---|
| 4,912,659 A | 3/1990 | Liang | |
| 6,906,716 B2 | 6/2005 | Moreton et al. | |
| 7,133,044 B2 | 11/2006 | Maillot et al. | |
| 7,245,299 B2 | 7/2007 | Sfarti | |
| 7,423,643 B2 | 9/2008 | Kallay | |
| 8,120,607 B1 * | 2/2012 | Legakis et al. | 345/423 |
| 8,169,437 B1 * | 5/2012 | Legakis et al. | 345/423 |
| 8,259,111 B2 * | 9/2012 | Goel et al. | 345/426 |
| 2006/0114252 A1 | 6/2006 | Ramani et al. | |
| 2010/0164955 A1 * | 7/2010 | Sathe et al. | 345/423 |

OTHER PUBLICATIONS

Harris, et al., "Parallel Prefix Sum (Scan) with CUDA" Chapter 39, retrieved on Aug. 12, 2009 at <<http://http.developer.nvidia.com/GPUGems3/gpugems3_ch39.html>>, Pearson Education, Inc., Copyright 2008 NVIDIA Corporation, 15 pages.

Keller, "Parallel Tessellation of Bezier Surface Patches Using a SIMD Processor Array" Department of Computer Science UNC—Chapel Hill, 1995, pp. 1-67.

Padron et al., "Efficient Parallel Implementations for Surface Subdivision", Fourth Eurographics Workshop on Parallel Graphics and Visualization, 2002, pp. 113-121.

* cited by examiner

*Primary Examiner* — Phu K Nguyen
(74) *Attorney, Agent, or Firm* — Lee & Hayes, PLLC

(57) ABSTRACT

Triangles are tessellated by an algorithm that is adapted for efficient parallel processing. A plurality of input triangles for tessellation are received. Within each input triangle, a number of tessellated vertices and a number of output triangles to be generated are calculated. A scan-based methodology accesses data stored in lookup tables to generate locations of the output triangles within the input triangle. In some implementations, multiple output triangles within the input triangle are generated simultaneously by parallel processing. A tessellated input triangle is divided into the multiple output triangles that are rendered in a computer graphic system.

20 Claims, 11 Drawing Sheets

PARALLEL TRIANGLE TESSELLATION

TECHNICAL FIELD

The subject matter of this application relates generally to computer graphics, particularly to triangle tessellation.

BACKGROUND

Computer graphics rely on computationally efficient methods of rendering complex shapes. One technique for simplifying a complex shape so a computer may easily manipulate it is to create a wire frame model of the shape. Some wire frame models are created with numerous triangles. When the triangles are large, the rendering is less accurate and appears as a coarse representation of the shape. However, as the triangles used to model the shape become smaller and more numerous, the level of detail becomes finer and more realistic.

Tessellation is one technique used to generate a set of smaller output triangles from a larger, coarse input triangle. It is used in graphics applications to generate detailed geometry shapes. In tessellation, each input triangle is subdivided into smaller output triangles, according to user specified factors. Generally, the tessellation is performed in a sequential first-in-first-out (FIFO) order (e.g., triangle by triangle). Moreover, the tessellation of each triangle is also executed in a sequential order, which limits performance on current multi-core processors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This application presents a parallel tessellation technique for tessellating input triangles with an algorithm for efficient parallel processing. This algorithm supports infinite level of tessellations for each input triangle. This approach maintains a First In First Out (FIFO) order of the input triangles, while executing the tessellation blocks in parallel to take advantage of multi-core central processing units (CPUs) and graphical processing units (GPUs) that support general purpose computation.

Input triangles for tessellation are received and a number of tessellated vertices and a number of output triangles are calculated based on the input triangle. The number of tessellated vertices and the number of output triangles may be stored in an array. A prefix sum may be computed from the array. The tessellated vertices are generated and a topology of the output triangles is built. Generation of the vertices and building the topology may be performed separately. The output triangles within the input triangle are generated based on the tessellated vertices in the topology of the output triangles. The tessellated triangles may be displayed on a display of a computing device.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Tessellation Overview

In computer graphics, tessellation techniques are often used to manage datasets of polygons and divide them into suitable structures for rendering. For real-time rendering, graphics data may be tessellated into triangles, referred to as triangulation. In computer-aided design, arbitrary 3-D shapes are often too complicated to analyze directly, so they are divided (tessellated) into a mesh of small, easy-to-analyze pieces such as triangles.

Figure 1:
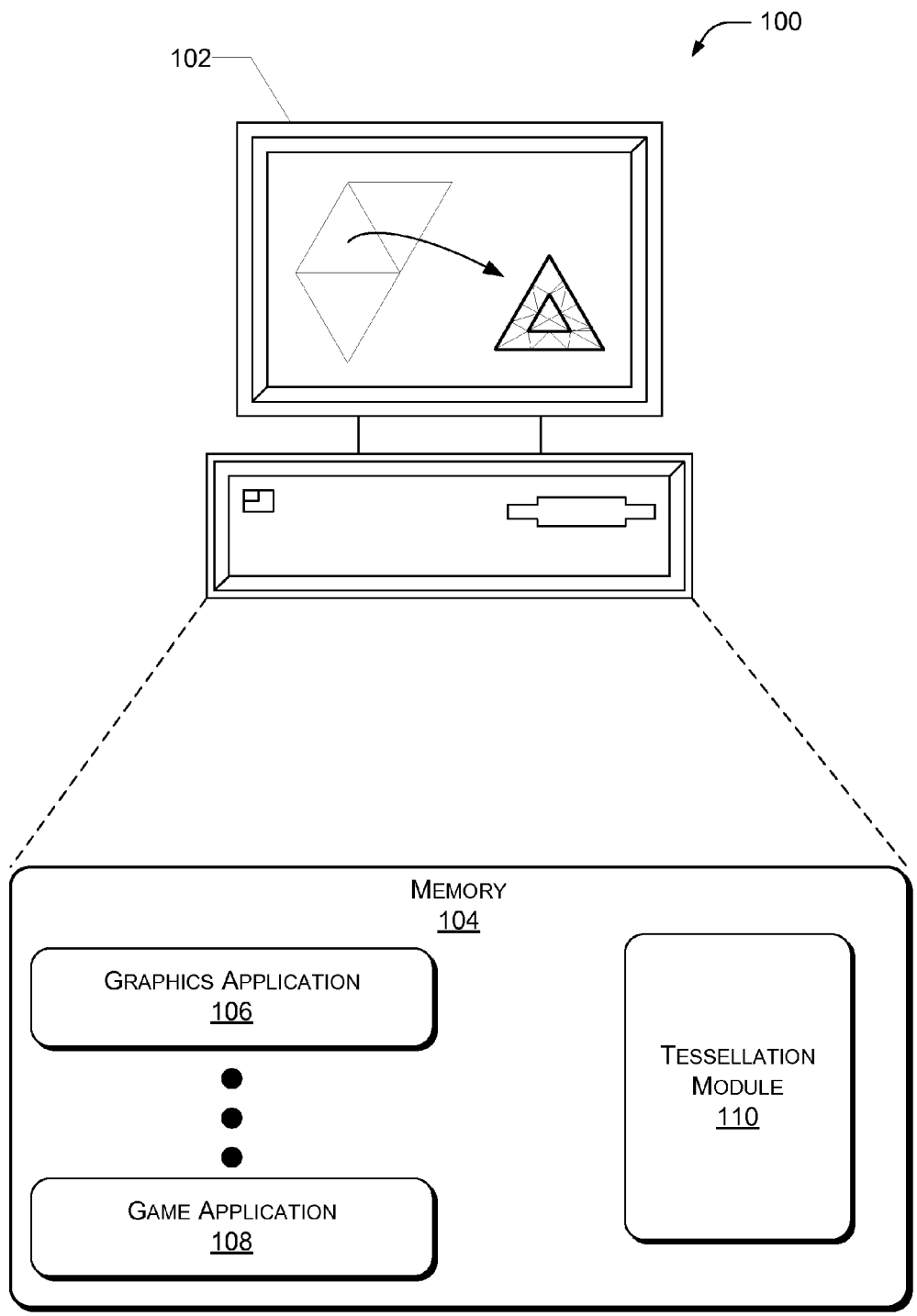
FIG. 1 is an architecture showing an illustrative computing device for tessellating triangles.

FIG. 1 shows an architecture 100 of a computing device 102 for tessellating triangles. A display of the computing device 102 shows an illustration of a result of one of three large triangles tessellated into a plurality of smaller output triangles. Memory 104 of the computing device 102 may contain several software applications that rely on tessellation. For example, memory 104 may contain a graphics application 106 for modeling 2-D or 3-D images such as a computer aided drafting software or a computer animation software. Memory 104 may also contain a game application 108 which creates detailed, real-time 3-D graphics as part of the game interface. Memory 104 may contain many other applications which rely on tessellation to a greater or lesser degree. While the process of tessellation largely involves manipulation of number representing triangles, the ultimate output is an image rendered on a display device.

The memory 104 also contains a tessellation module 110. The tessellation module 110 stores instructions for execution on the computing device 102 to tessellate input triangles according to a given algorithm. Various tessellation algorithms may generate similar outputs while varying significantly in the efficiency of the algorithm, and thus, the speed at which tessellation occurs. Frequently, there may be a trade-off between the level of detail (e.g., finer tessellation) and the speed at which tessellation occurs. For example, in game application 108 real-time rendering of 3-D images is important to create a smooth flowing output. The speed necessary to achieve the smooth flow and output may be improved by reducing the level of detail or by using a computing device 102 with a more powerful central processing unit (CPU) or a graphical processing unit (GPU). The tessellation algorithm contained in this disclosure makes it possible to have a greater level of output detail and real-time rendering by taking full advantage of multi-core processors. This tessellation algorithm may be efficiently processed in parallel. Previous tessellation algorithms are not amenable to parallel processing, and thus, unable to fully use the parallel processing capabilities of multi-core CPUs and GPUs.

Illustrative Tessellation Algorithm

For ease of understanding, the processes discussed in this disclosure are delineated as separate blocks represented as independent blocks. However, these separately delineated blocks should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided blocks will be omitted.

The processes are illustrated as a collection of blocks in logical flowcharts, which represent a sequence of blocks that may be implemented in hardware, software, or a combination of hardware and software. For discussion purposes, the processes are described with reference to the system shown in FIG. 1. However, the processes may be performed using different architectures and devices.

Figure 2:
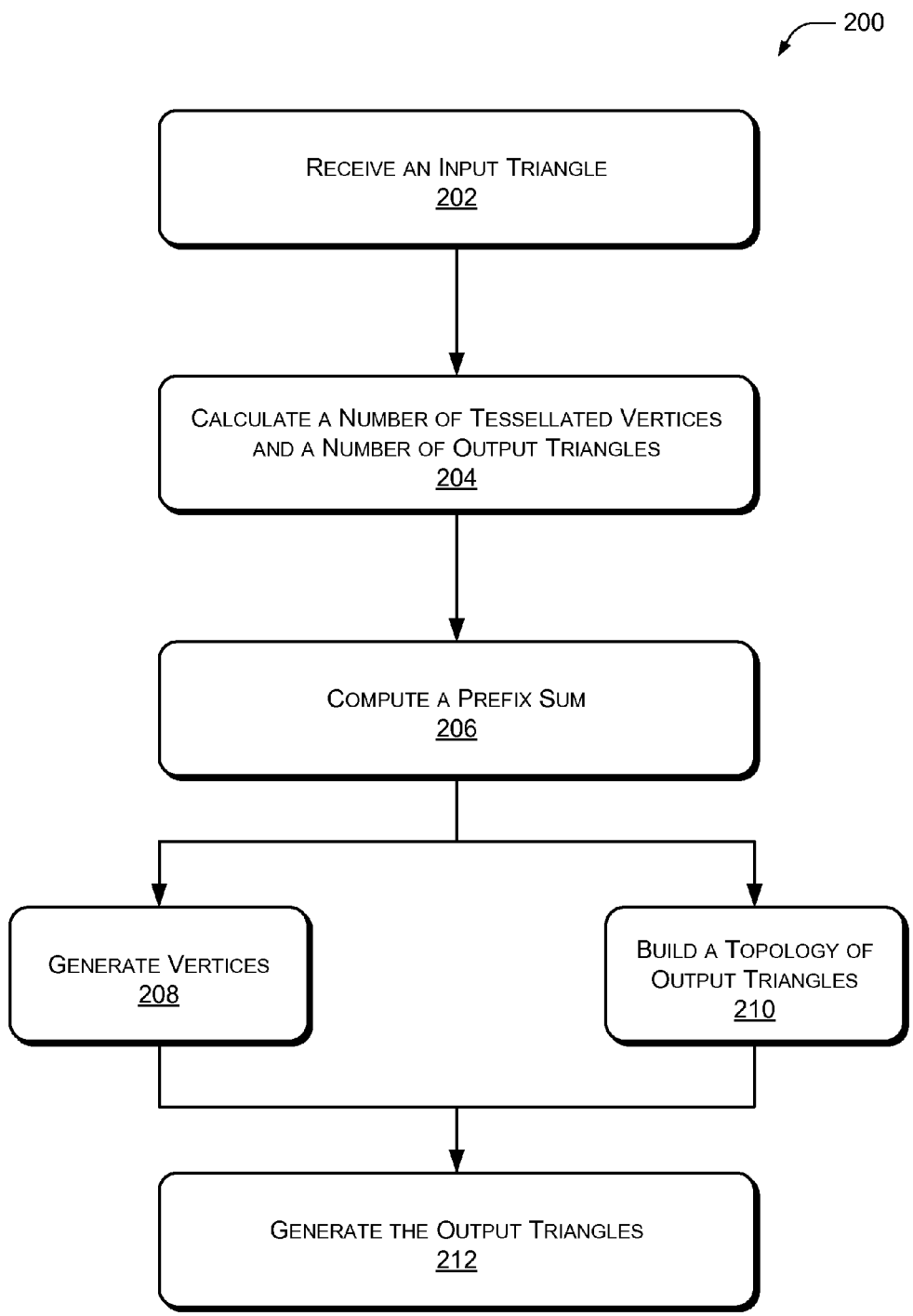
FIG. 2 a flowchart showing an illustrative process of tessellating triangles.

FIG. 2 provides an overview of the tessellation process. Shown in FIG. 2 is a flow diagram of an illustrative process 200 for tessellating triangles. In block 202, an input triangle is received. The input triangle may be received from a function call initiated directly from a user, or initiated indirectly by the user as a result of launching an application that provides an input triangle and generates a function call to tessellate the triangle.

In block 204, a number of tessellated vertices and a number of a number of output triangles are calculated. The output triangles are the smaller triangles which are generated within the input triangle. Each output triangle has, of course, three corners and these corners of the output triangles are referred to as tessellated vertices. Calculating the number of tessellated vertices and the number of output triangles early in the algorithm provides data that will enable parallel processing. Parallel processing will be discussed below in more detail.

In block 206, a prefix sum is computed. The prefix sum (also known as a scan, a prefix reduction, or a partial sum) is a block on an operand list of data in which each element in a resulting list is obtained from a sum of the elements in the operand list up to the index of the given element. The prefix sum is performed to keep track of the input triangles by separating the input triangles using an index of a data structure. The separation and indexing allows for an output triangle to be matched with the appropriate input triangle.

Following computation of the prefix sum 206, process 200 logically splits to generation of vertices 208 and building a topology of output triangles 210.

In block 208, vertices of the output triangles are generated. All output vertices for each output triangle within the input triangle may be computed and processed in parallel. Barycentric coordinates of the new vertices are calculated in this block, whereas in block 204 the number of tessellated vertices, rather than coordinates may be calculated.

In block 210, a topology of output triangles is built. The topology of triangles may be regular or irregular. In the building of the topology of output triangles, computations for each output triangle of the input triangle may be executed in parallel.

In block 212, the output triangles are generated. The output triangles are generated based on the generated vertices and the topology of output triangles. Once generated, the output triangles are rendered on a display of a device to create a more detailed image than would have been created by utilizing only the input triangles. This algorithm may be repeated recursively so that the output triangles of a first iteration are in the input triangles of a second iteration. Iterative repetition allows for finer and finer levels of detail through "infinite" tessellation.

Figure 3:
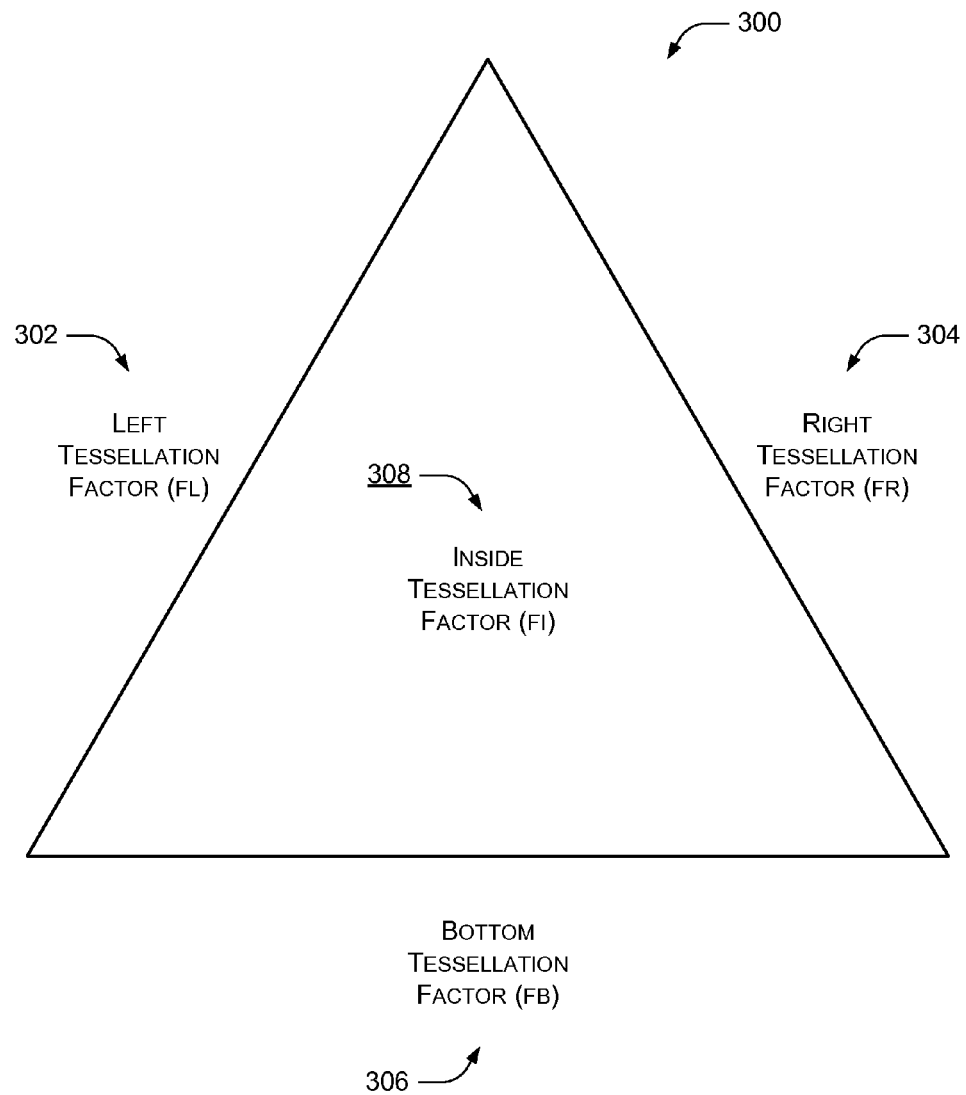
FIG. 3 is diagram showing an illustrative input triangle with tessellation factors.

FIG. 3 shows a diagram of an input triangle 300 with tessellation factors. The input is a batch of factors of coarse mesh of n triangles, because the image which is ultimately rendered generally involves a large number, n, of triangles to represent the rendered image. The batch of factors for n input triangles may be represented as a factor array $T_f = [fl_0, fr_0, fb_0, fi_0, fl_1, fr_1, fb_1, fi_1, \ldots fl_n, fr_n, fb_n, fi_n]$. Each input triangle has four tessellation factors: a left tessellation factor (fl) 302, a right tessellation factor (fr) 304, a bottom tessellation factor (fb) 306, and an inside tessellation factor (fi) 308. These tessellation factors may determine the tessellation level of left edge, right edge, bottom edge, and triangle inside, respectively. A parameter declaring the maximum tessellation factor of the input triangle may also be provided along with the other tessellation factors. The maximum tessellation factor will be discussed below in more detail.

Figure 4:
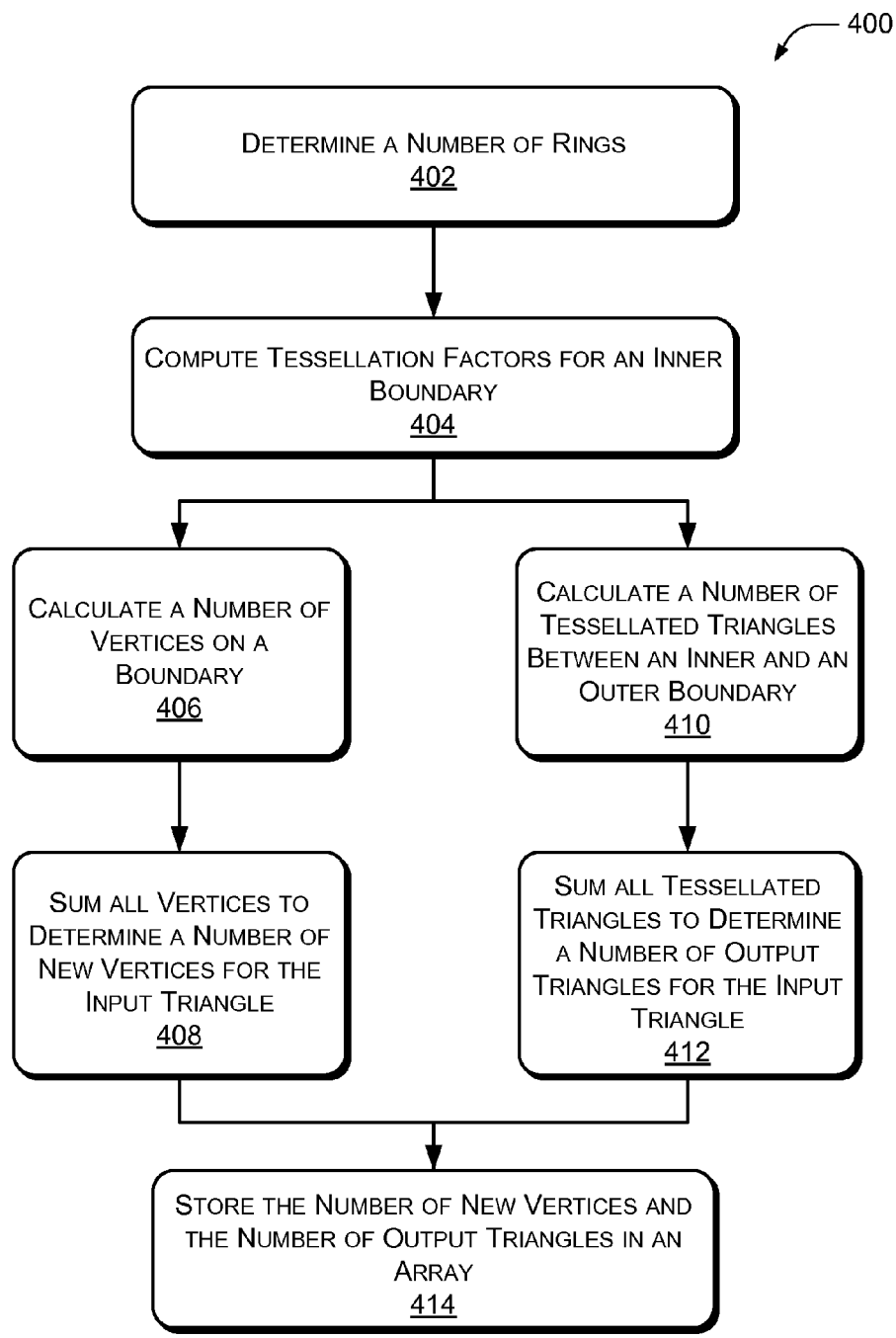
FIG. 4 is a flowchart showing an illustrative detail of calculating a number of tessellated vertices and a number of output triangles from the process of FIG. 2.

FIG. 4 is a flow diagram of an illustrative process 400 showing details of calculating the number of tessellated vertices and the number of output triangles from block 204 of FIG. 2. In block 402 a number of rings in the input triangle 300 is determined. For each coarse input triangle, the output triangles may be grouped into multiple rings. The number of rings is determined by $\lceil f_i/2 \rceil + 1$. As is evident from the equation, the number of rings is determined by the inside tessellation factor 308. Generally, the outermost ring may be designated ring 0 (zero). Each ring is enclosed by two boundaries: an outer boundary and an inner boundary. The rings are concentric rings within a triangle so each boundary has three edges. For input triangles that have more than one ring, as determined by the above equations, an outer ring's inner boundary is the next most inner ring's outer boundary.

In block 404, a tessellation factor for the inner boundary of a ring is computed. This block may be repeated for each inner ring boundary in the input triangle. For the outermost ring (e.g., ring 0), the tessellation factor of the inner boundary edge is computed by $f = f_i - 2$. For any of the inner rings, the tessellation factor of the inner boundary edge is $f_{in} = f_{out} - 2$, where $f_{out}$ is the tessellation factor of the corresponding edge in the outer boundary of that ring.

After computing the tessellation factors for the inner boundaries, process 400 logically splits to calculate both a total number of vertices and a total number of output triangles.

In block 406, a number of vertices on each inner and outer boundary edge may be calculated. Given the tessellation factor f of a boundary edge, the number of new vertices (nv) on that boundary is calculated by $nv(f) = \lceil f/2 \rceil * 2 + 1$. The vertices may be thought of as a corner of an output triangle that lies on a ring boundary.

In block 408, all the vertices are summed to determine a total number of new vertices for the input triangle. Since the ultimate generation of output triangles is tessellation, the new vertices may also be referred to as tessellated vertices. The total number of tessellated vertices is a sum of the new vertices on each boundary edge. The four tessellation factors of the input triangle, left tessellation factor 302, right tessellation factor 304, bottom tessellation factor 306 and inside tessellation factor 308 are all used to calculated the total number of new vertices by:

$$nv(f_l) + nv(f_r) + nv(f_b) + 3 * \sum_{f=f_i-2}^{0} nv(f)$$

where f is decremented by 1.

In block 410, a number of tessellated triangles between an inner ring boundary and an outer ring boundary is calculated. As mentioned previously, each input triangle is divided into one or more concentric rings and each ring has both an outer boundary edge and an inner boundary edge. Tessellation factors for the outermost boundary edges (right, left, and bottom) may be provided with the input triangle. Tessellation factors for the boundary edges other than the outermost boundary edges (i.e., inner boundaries) are calculated in block 404. Given the tessellation factor of an outer boundary edge $f_{out}$ and tessellation factor of the corresponding inner boundary edge $f_{in}$, the number of tessellated triangles (nt) between them is computed as: $nt(f_{out}, f_{in})=2*(\lceil f_{out}/2 \rceil + \lceil (f_{in}-2)/2 \rceil)$. This provides a number of tessellated triangles for one ring of the input triangle.

In block 412, all tessellated triangles are summed to determine a total number of output triangles for the input triangle. The total number of tessellated, or output, triangles of the input triangle is the sum of the triangles in each ring. Thus, the total number of output triangles of the input triangle is calculated by:

$$nt(f_l, f_i) + nt(f_r, f_i) + nt(f_b, f_i) + 3 * \sum_{f=f_i-2}^{0} nt(f, f)$$

where f is decremented by 1.

In block 414, the total number of new vertices and the total number of output triangles are stored in an array. An array is illustrative of one of many techniques for organizing and storing information in a computer-readable form. It is to be understood that other storage techniques and data structures are equally suitable. To enable parallel tessellation of each input triangle, the address of each new vertex and an index of each output triangle may be stored in an output buffer. The total size of the output buffer may also be used to perform tessellation.

The algorithm of this disclosure first computes the number of the output vertices and output indices of each input triangle from the input tessellation factors using the equations shown above. This may be done in parallel leading to efficiencies when performed on a computing device capable of parallel processing. The output may be stored in a temporary array.

The approach described in this disclosure tessellates the input triangles according to the given tessellation factors and outputs smaller triangles. This output is stored in two arrays. The first array $T_v=[v_0^0 v_1^0 \ldots v_{m_0}^0 \ldots v_0^n \ldots v_{m_n}^n]$ stores the barycentric coordinates of the new tessellated triangle vertices. Each group of vertices $v_0^i v_1^i \ldots v_{m_i}^i$ is generated from one input triangle. The second array $T_i=[t_0^0 t_1^0 \ldots t_{k_0}^0 \ldots t_0^n \ldots t_{k_n}^n]$ stores the vertex indices of the result triangle list. Each group of triangle vertex indices $t_0^i t_1^i \ldots t_{t_i}^i$ represents the output triangles generated from one input triangle.

Figure 5:
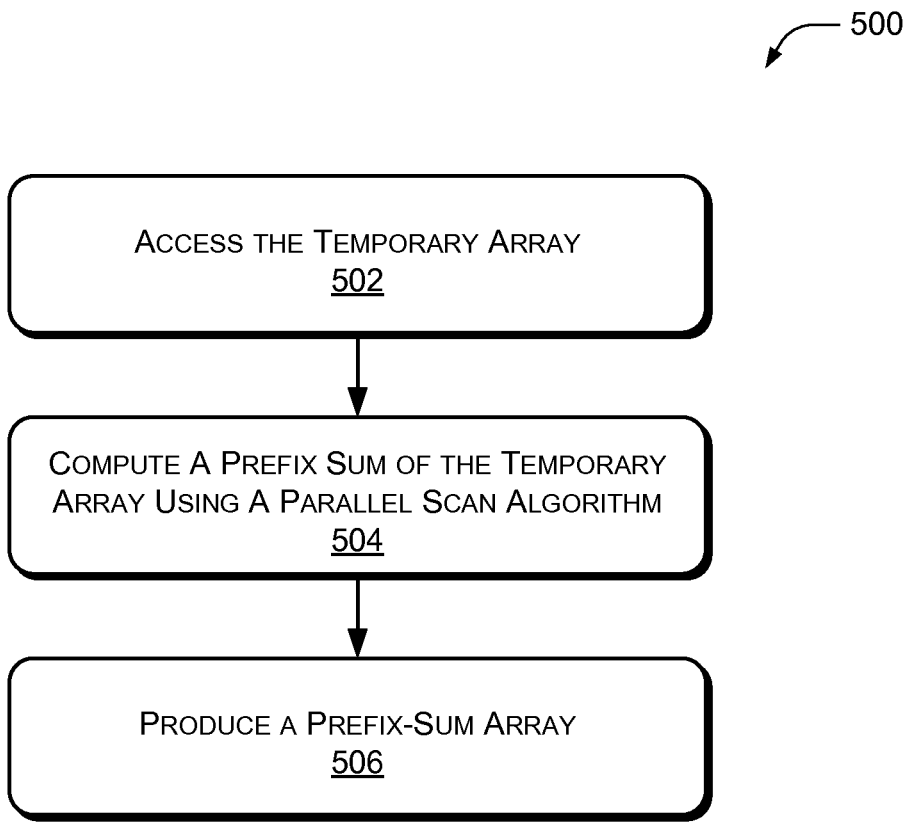
FIG. 5 is a flowchart showing an illustrative detail of computing a prefix sum from the process of FIG. 2.

FIG. 5 is a flow diagram of an illustrative process 500 showing details of computing a prefix sum from block 206 of FIG. 2. In block 502, the temporary array created in block 414 of FIG. 4 is accessed.

In block 504, a prefix sum of the temporary array is computed by using a parallel scan algorithm. The prefix sum (also known as an "exclusive scan") may be computed for an element in the temporary array by summing all of the preceding elements up to the element in the temporary array. In some implementations, the parallel scan algorithm is a work-efficient parallel scan algorithm which performs the summing blocks in place on the temporary array in a shared memory. The work-efficient parallel scan algorithm consists of an up-sweep phase that traverses a balanced binary tree generated from the temporary array from leaves to root computing partial sums at interval nodes of the tree. After this phase, the root node holds the sum of all nodes in the array. In a down-sweep phrase the balanced binary tree is traversed starting from the root using partial sums from the reduced phase to build the prefix sum in place on the array.

In block 506, a prefix-sum array is produced in place of the temporary array. In the prefix-sum array, each element is the address of the tessellation result of each input triangle in the output buffer. The last element in the array is the total number of output vertices and output triangles.

Figure 6:
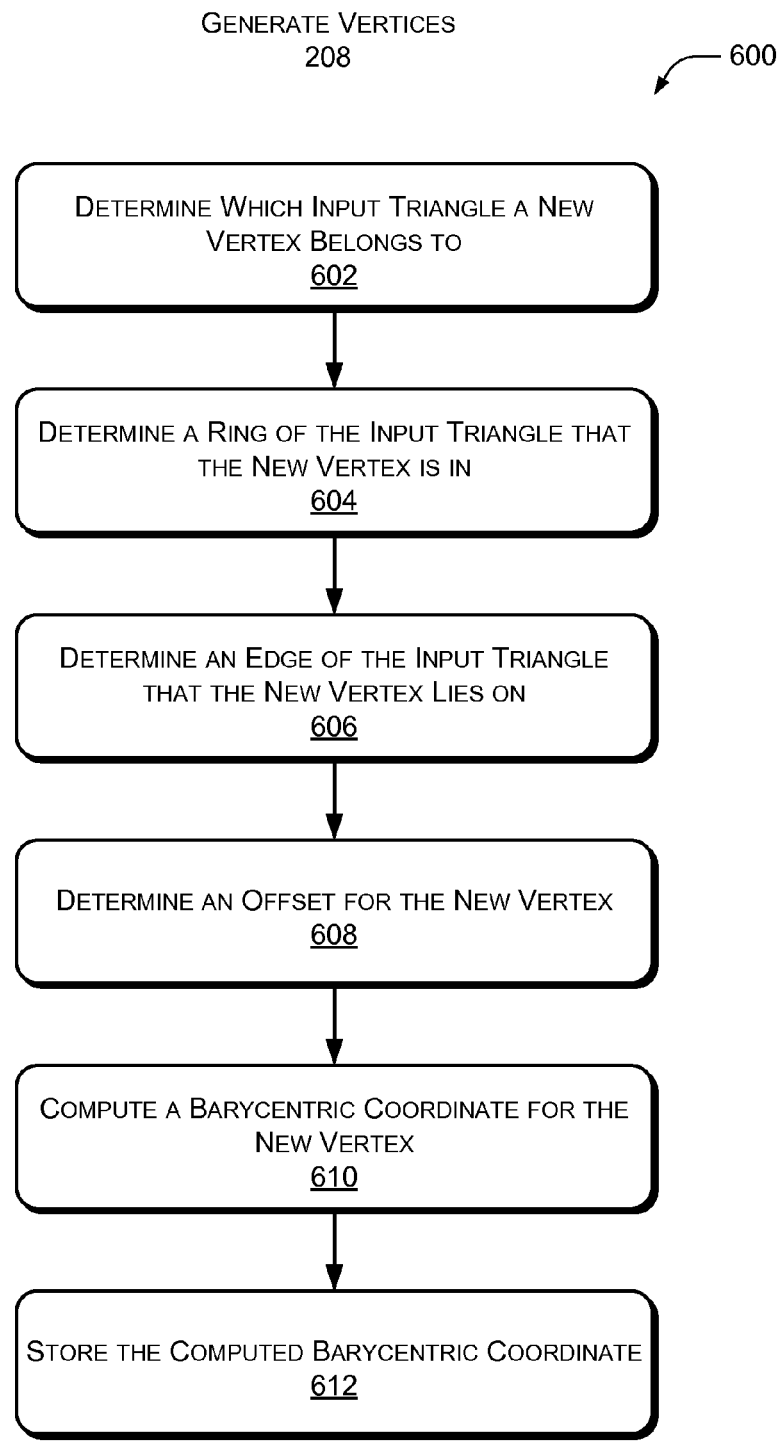
FIG. 6 is a flowchart showing an illustrative detail of generating vertices from the process of FIG. 2.

FIG. 6 is a flow diagram of an illustrative process 600 showing details of generating vertices from block 208 of FIG. 2. Generally, process 600 generates all vertices of the output triangles and stores their barycentric coordinates in an output vertex buffer. All input triangles may be processed in parallel in this step. Moreover, all output vertices of an input triangle may also be computed and processed in parallel.

In block 602, the input triangle to which a new vertex belongs is determined. Each new vertex in the output vertex array is associated with an index based on the location of the new vertex in the output vertex array. The prefix-sum array obtained in block 506 is traversed with a binary search to determine which input triangle a new vertex belongs, and the ring and edge of the input triangle that the new vertex lies in. The vertex index (vi) is based on the left, right, and bottom tessellation factors of the input triangle.

In block 604, a ring of the input triangle that the new vertex is in is determined. The vertex is in the first ring boundaries (referred to above as ring 0) if $vi<nv(f_l)+nv(f_r)+nv(f_b)$, where (nv) is the number of new vertices, $(f_l)$ is the left tessellation factor, $(f_r)$ is the right tessellation factor, and $(f_b)$ is the bottom tessellation factor as defined above. When the above inequality is not true, the vertex belongs to a ring other than the outermost ring 0 (e.g., one of the inner rings).

In block 606, an edge of the input triangle that the new vertex lies on is determined. The technique for determining the image is different for the outermost ring than for the inner rings.

When the ring is the outermost ring 0, the edge on which the new vertex lies (edge (vi)) is determined by:

$$edge(vi) = \begin{cases} 0, & vi < nv(f_l) \\ 1, & vi - nv(f_l) < nv(f_r) \\ 2, & else \end{cases}$$

where the three edges of the ring are designated as edges 0, 1, and 2.

When the ring is other than the outermost ring (e.g., one of the inner rings) the ring on which the new vertex lies (vr) is calculated by solving the following inequalities:

$$\begin{cases} vi < vr(\text{ring}+1) \\ vi > vr(\text{ring}) \end{cases}$$

such that a ring number (ring) which satisfies both inequalities (i.e., the ring immediately inside the outermost ring 0 is ring 1, the ring inside that is ring 2, and so on) where:

$$vr(\text{ring}) = nv(f_l) + nv(f_r) + nv(f_b) + 3 * \sum_{r=1}^{ring-1} nv(f_i - r*2),$$

where r is decremented by 1. The edge on which the new vertex lies (edge (vi)) is then determined by:

$$\text{edge}(vi) = (vi - vr(\text{ring}))/nv(f_i - \text{ring}*2).$$

In block 608, an offset is determined for the new vertex. The offset is an integer indicating the displacement of the new vertex from the corresponding vertex of an outer boundary triangle—an output triangle that shares its vertex with the outer boundary triangle will have offset 0. When the ring is the outermost ring, the offset of the new vertex (offset (vi)) is determined by:

$$\text{offset}(vi) = \begin{cases} vi, & vi < nv(f_l) \\ vi - nv(f_l), & vi - nv(f_l) < nv(f_r) \\ vi - nv(f_l) - nv(f_r), & \text{else.} \end{cases}$$

When the ring is not the outermost ring the offset is determined by:

$$\text{offset}(vi) = \text{mod}((vi - vr(\text{ring})), nv(f_i - \text{ring}*2)),$$

where vr(ring) is calculated as shown above.

In block 610, barycentric coordinates for the new vertex are computed. The barycentric coordinates of the new vertex may be computed from the ring and the edge of the new vertex. Barycentric coordinates is discussed in more detail in FIG. 7.

In block 612, the computed barycentric coordinates are stored. The result as calculated in block 720 below are stored to the vi-th element of the output vertex buffer where vi is the index of the new vertex.

Figure 7:
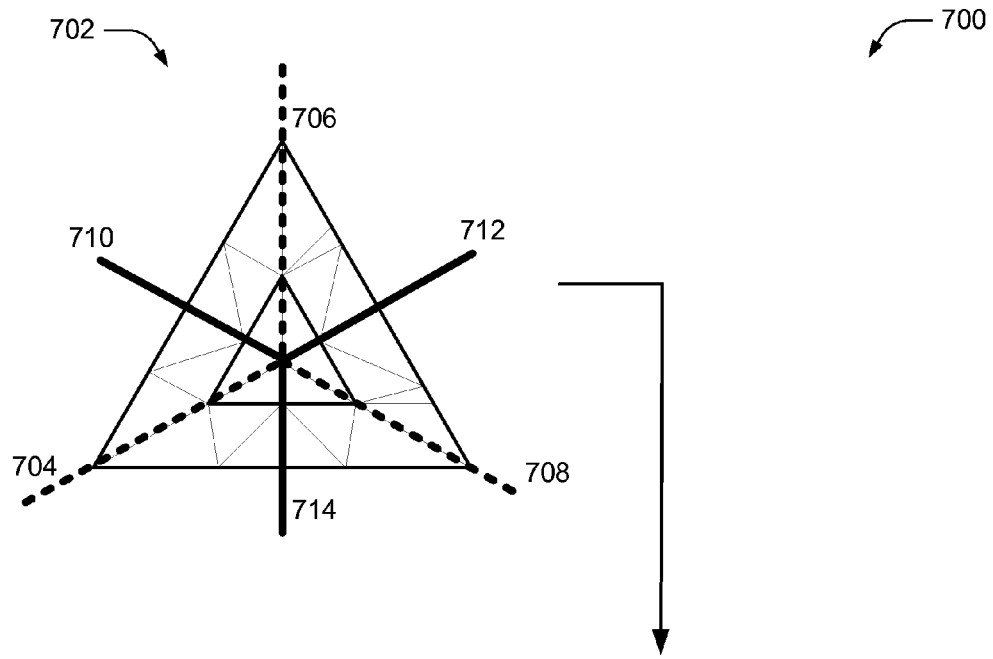
FIG. 7 is a flowchart showing an illustrative detail of computing a barycentric coordinate for a new vertex from the process of FIG. 6.

FIG. 7 is an illustrative process 700 showing details of block 610 from FIG. 6. For each input triangle 300 barycentric coordinates of the edges and the end points are pre-computed. Six edges are formed on a triangle 702 by six lines radiating from the center of the triangle 702 to either a corner 704, 706, 708 or to a midpoint of an outer edge 710, 712, 714. This initial subdivision provides reference points for pre-computing barycentric coordinates.

In block 716, a boundary edge of the input triangle that the new vertex lies on is divided into two segments. For example, the bottom edge of triangle 702 may be divided into two segments of equal length by bisecting the bottom edge at its midpoint 714.

In block 718, a relative position of the new vertex on the segment it belongs to is determined. For a new vertex that is located on one of the two segments, the relative position (p) of the new vertex relative to the segment may be defined by:

$$p = \text{lerp}(\lfloor \text{offset}/(f/2) \rfloor, \lceil \text{offset}/(f/2) \rceil, \text{frac}(f/2)),$$

where lerp( ) is linear interpolation, frac( ) is the fractional part of the parameter, f is the tessellation factor of that boundary edge computed as described above.

In block 720, the barycentric coordinate for the new vertex is computed via linear interpolation of the ends of the segment and the relative position. Given $v_0$ and $v_1$ as two ends of the segment, lerp($v_0$, $v_1$, p) computes the barycentric coordinates of a new vertex. Based on the pre-computed barycentric coordinates of the edges, it is computationally simple to identify all ends of the boundary edge by following the rules defined above. Thus, barycentric coordinates for all new vertices on the boundary edge may be computed on-the-fly when the barycentric coordinates of each output vertex are generated. Accordingly, it is not necessary to store end points of all edges.

Figure 8:
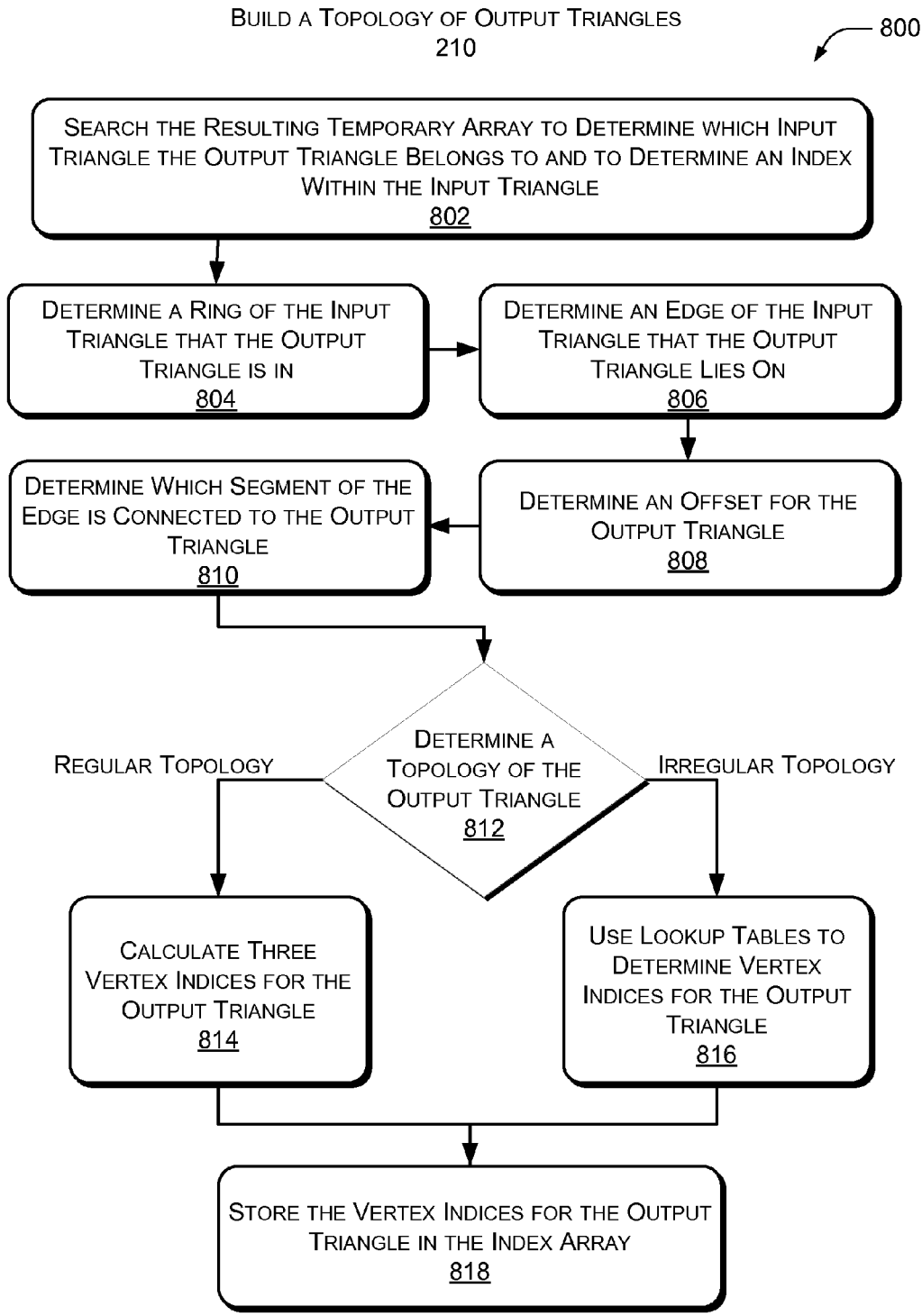
FIG. 8 is a flowchart showing an illustrative detail of building a topology of output triangles from the process of FIG. 2.

FIG. 8 is an illustrative process 800 showing details of block 210 from FIG. 2. The process 800 generally describes determining indices within the input triangle to build a topology of output triangles and storing results to an index array. The computation for each input triangle may be done in parallel. The formulas for computing triangles are similar to the formulas for computing vertices discussed above with respect to FIG. 6.

In block 802, the prefix-sum array 506 is searched to determine an input triangle that the output triangle belongs to. Each output triangle has an index (ti) in an index array which may be used to determine an index of the output triangle within the input triangle. The prefix-sum array produced in block 506 of FIG. 5 is searched with a binary search based on the index of each a triangle in the index array. Thus, the binary search identifies which input triangle the output triangle belongs to and the index of the output triangle in the index array.

In block 804, the ring of the input triangle within which the output triangle is located is determined. The ring in which the new triangle is located is determined based on the left, right, bottom, and inside tessellation factors. The ring is identified as the outermost ring 0, when:

$$ti < nt(f_l, f_i) + nt(f_r, f_i) + nt(f_b, f_i).$$

If the above inequality is not true, then the ring is an inner ring, not the outermost ring. As discussed above, if the outermost ring is designated ring 0 the ring immediately inside of ring 0 is designated ring 1 and so on. When the ring is not the outermost ring, the ring (tr) on which the output triangle is created is identified by solving the following inequalities:

$$\begin{cases} ti < tr(\text{ring}+1) \\ ti > tr(\text{ring}) \end{cases}$$

where ring is the ring number (e.g., 0, 1, 2, etc.) and where:

$$tr(\text{ring}) = nt(f_l, f_i) + nt(f_r, f_i) + nt(f_b, f_i) + 3 * \sum_{r=1}^{ring-1} nt(f_i - r*2, f_i - r*2),$$

where r is decremented by 1.

In block 806, an edge of the input triangle that the output triangle lies on is determined. As discussed previously, the three sides of a triangle are denoted as edges 0, 1, and 2. Determination of an edge of the input triangle is performed differently for the outermost ring than for an inner ring.

When the output triangle is in the outermost ring, ring 0, the edge that the output triangle lies on (edge (ti)) is determined by:

$$\text{edge}(ti) = \begin{cases} 0, & ti < nt(f_l, f_i) \\ 1, & ti - nt(f_l, f_i) < nt(f_r, f_i) \\ 2, & \text{else.} \end{cases}$$

When the output triangle is in a ring other than the outermost ring, the edge that the output triangle lies on is determined by:

$$\text{edge}(ti) = (ti - tr(\text{ring}))/nt(f_i\text{-ring}*2, f_i\text{-ring}*2)$$

where tr(ring) is defined the same as in block 804.

In block 808, an offset for the output triangle is determined. Similar to the other blocks, determination of the offset is different for output triangles in the outermost ring than for output triangles in the inner rings. The offset is an integer indicating the displacement of the output triangle in the index array containing the index (ti) for each output triangle. When the output triangle is created in the outermost ring, the offset of the output triangle (offset(ti)) is determined by:

$$\text{offset}(ti) = \begin{cases} ti, & ti < nt(f_l, f_i) \\ ti - nt(f_l, f_i), & ti - nt(f_l, f_i) < nt(f_r, f_i) \\ ti - nt(f_l, f_i) - nt(f_r, f_i), & \text{else.} \end{cases}$$

When the output triangle is in a ring other than the outermost ring (i.e., an inner ring) the offset is determined by:

$$\text{offset}(ti) = \text{mod}((vi - tr(\text{ring})), nt(f_i\text{-ring}*2, f_i\text{-ring}*2)).$$

where tr(ring) is calculated as shown above.

In block 810, a segment of the edge to which the output triangle is connected is determined. Each ring boundary edge is divided into two segments which may be identified as a first segment and a second segment. The triangle 702 shown in FIG. 7 illustrates the outside boundary edges divided into two segments by lines 710, 712, 714 bisecting the midpoint of the outside edges. For example, if the output triangle has two vertices on a segment, that segment is identified as the segment to which the output triangle is connected. If a segment is an outer boundary (of the outer ring or of an inner ring), that outer segment is connected to ⌈f/2⌉ output triangles; inner boundary segments are connected to ⌈(f-2)/2⌉ output triangles, where f is the tessellation factor of the boundary segment.

In block 812, a topology of the output triangle is determined. The topology may be regular or irregular. Output triangles located in the outermost ring have an irregular topology. Output triangles located in an inner ring have a regular topology. The regular topology is made up of congruent triangles. Two triangles are congruent if their corresponding sides are equal in length and their corresponding angles are equal in size. In the irregular topology, some triangles are not congruent with other triangles because length of their sides and size of their angles are different from lengths and sizes of corresponding sides and angles of other triangles in the irregular topology.

When the topology is determined to be regular, the process 800 proceeds to block 814 and calculates three vertex indices for the output triangle. Recall that the inner rings have inner and outer boundaries and that each ring edge boundary is divided into two segments in block 810.

For an output triangle connected to the first segment of an outer boundary, the three vertex indices are:

[tr(ring)+offset(ti),tr(ring)+offset(ti)+1,tr(ring+1)+
    offset(ti)].

For an output triangle connected to the second segment of the outer boundary, the three vertex indices are:

[tr(ring)+offset(ti),tr(ring)+offset(ti)+1,tr(ring+1)+
    offset(ti)-1].

For an output triangle connected to the first segment of an inner boundary, the three vertex indices are:

[tr(ring+1)+offset(ti),tr(ring)+offset(ti)+1,tr(ring+1)+
    offset(ti)+1].

For an output triangle connected to the second segment of the inner boundary, the three vertex indices are:

[tr(ring+1)+offset(ti),tr(ring)+offset(ti)+2,tr(ring+1)+
    offset(ti)+1].

Figure 9:
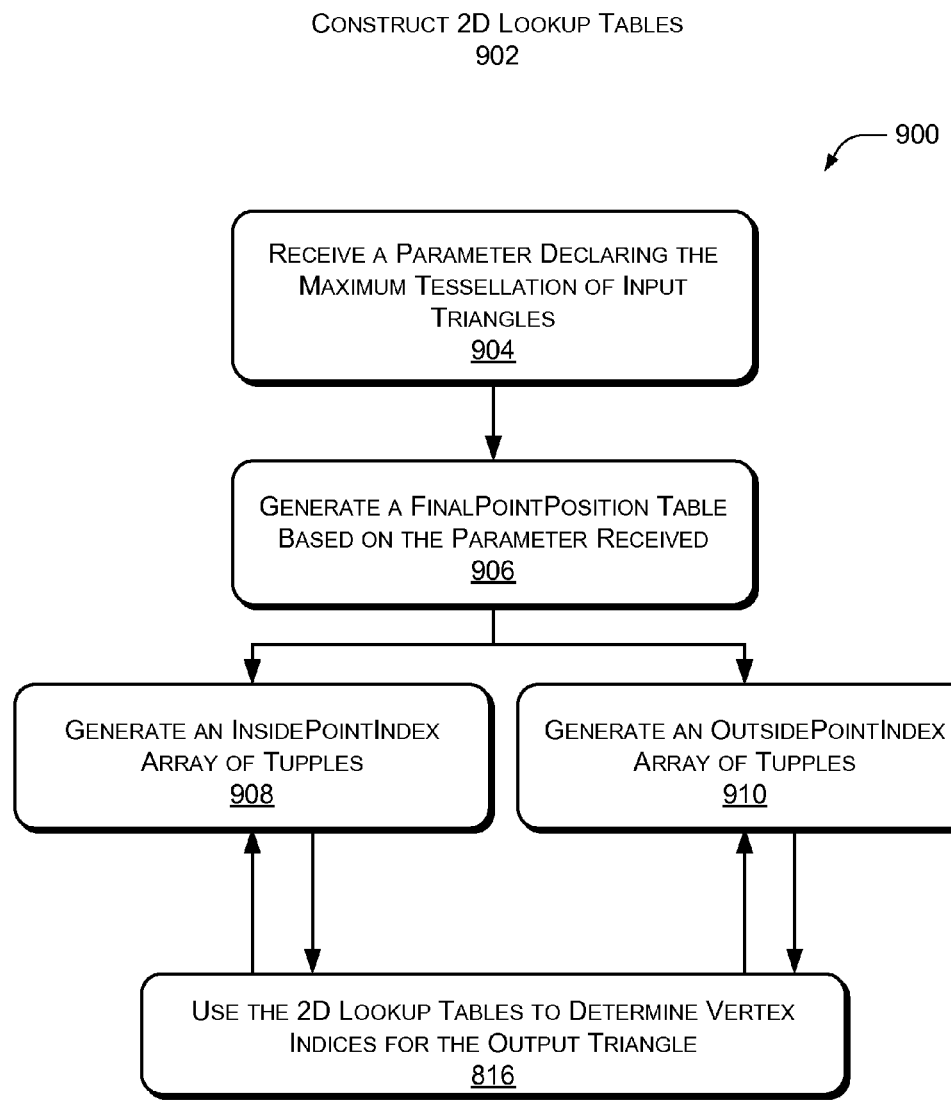
FIG. 9 is a flowchart showing an illustrative detail of constructing 2D lookup tables from the process of FIG. 8.

When the topology is determined to be irregular, the process 800 proceeds to block 816 and uses lookup tables to determine vertex indices for the output triangle. Two precomputed 2D lookup tables (LUTs) are used to determine the topology and the output of each input triangle such that the computation for each output triangle may be executed in parallel. FIG. 9 discusses construction of 2D lookup tables in more detail.

In block 818, the vertex indices for the output triangle is stored in the index array. Process 800 may be performed for each output triangle within the input triangle until vertex indices for all of the output triangles are stored in the index array. The blocks of process 800 me be implemented as a vertex shader with stream output on a GPU, or executed in parallel on multi-core CPUs.

FIG. 9 is an illustrative process 900 for construction of 2D lookup tables 902. The results of the process 900 generate lookup tables for use in block 816 described above. The two LUTs are an InsidePointIndex LUT and an OutsidePointIndex LUT. These two LUTs have the same structure. The first dimension of the tables may be the tessellation factor and the second dimension of the tables may be the index of the output triangles.

In block 904, a parameter declaring the maximum tessellation factor of the input triangle is received. This parameter is referred to as the "max factor" or MF. The max factor may be received when the input triangle is received.

The sizes of the two LUTs in both the first and the second dimensions are MF/2+1 because the number of output vertices on the first segment of an edge is MF/2+1 at most, and the second segment of topology is a mirrored copy of the first segment. Each element in the LUTs is a tuple of three integers. The first element in the tuple is 0 or 1, which indicates whether the index should be advanced (for example, 0 is no and 1 means yes). The second element is the prefix-sum scan result of the first element in the tuple. The last one is the addresses of the 1s in the first element in the tuple.

In block 906, a FinalPointPosition table is generated based on the maximum tessellation factor. The size of the FinalPointPosition table is [MF/2+1]. For each index counter (i), the FinalPointPosition table is generated by:

$$\text{FinalPointPosition}[i] = \begin{cases} 0, & i = 0 \\ \dfrac{MF}{2}, & i = 1 \\ \text{inorder traversal of a binary tree}, & i \geq 2 \end{cases}$$

The binary tree is a fixed tree based on MF so the FinalPointPosition table may be computed directly. For example, given a MF of 16 the FinalPointPosition table is {0, 8, 4, 2, 5, 1, 6, 3, 7}. The first position in the FinalPointPosition table may be designated 0 following standard array conventions. The FinalPointPosition table entries for i=0 and i=1 are given above. For i equal or greater than 2:

$$FinalPointPosition[i]=(MF/2+((i-2)-(2^{level}-1)))/2^{level+1},$$

where level is found by solving:

$$mod((i-2)-(2^{level}-1),2^{level+1})=0.$$

Further arrays may be generated from the FinalPointPosition table.

In block 908, an InsidePointIndex array of tuples is generated. The first elements of tuples in the InsidePointIndex array indicate whether an index should be increased. The first elements of the tuples may be built by a double loop initializing two variables h and i to 0, each ranging from 0 to MF/2, where when an i-th element of the FinalPointPosition table is less than value of h, the first element of the InsidePointIndex array tuple denoted by h and i, respectively, and the first element of the OutsidePointIndex array tuple denoted by h and i, respectively, is assigned a value of 1. The first element of the InsidePointIndex array tupple denoted by h and 0 is assigned a value of 0, as h is incremented in the double loop.

If FinalPointPosition[i]<h
InsidePointIndex[h][i][0]=OutsidePointIndex[h][i][0]=1
InsidePointIndex[h][0][0]=0

The second element of tuples in InsidePointIndex array is the prefix-sum scan result of the first element. The third element of the tuples in LUTs is a standard compact result of the first element. The standard compact removes 0s from InsidePointIndex array and writes 1s to the elements. The first, second, and third elements of the tuples for each output triangle are added to the array.

In block 910, an OutsidePointIndex array of tuples is generated. The first elements of tuples in the OutsidePointIndex array indicate whether an index may be increased. The OutsidePointIndex array is generated similar to the InsidePointIndex array as described in block 908.

The InsidePointIndex array and the OutsidePointIndex array may be generated on the fly. When the maximum tessellation factor is large, the 2D LUTs may be put into a texture and passed to a GPU for faster processing or to free a CPU for other work. These two 2D lookup tables define the topology pattern of the tessellated triangles.

In block 816, the 2D lookup tables are used to determine vertex indices for the output triangle. Generating the output triangle requires determining the vertex indices which in turn requires executing three lookup blocks on the 2D lookup tables. Each output triangle in a ring of the input triangle may have either two corners lying on an outside edge of the ring and one corner on an inside edge of the ring or conversely one corner lying on the outside edge of the ring and two corners lying on the inside edge of the ring.

Recall that when two corners of the output triangle lie on the outer edge of the ring, that output triangle is connected to the outer boundary of the ring. For the ith output triangle which is connected to the first segment of the outer boundary of an inner ring, the three vertex indices of the output triangle (designated t0, t1, and t2) are determined by:

$$t0=OutsidePointIndex[t_o/2][p][1],$$

where $$p=OutsidePointIndex[t_o/2][i][2],$$

where p is an element from a tuple of the OutsidePointIndex array and $t_o$ is a tessellation factor of the outer boundary of the ring.

The next vertex index is determined from the first vertex index:

$$t1=t0+1.$$

The third and final vertex index, is determined by:

$$t2=pi[0]+pi[1],$$

where $$pi=InsidePointIndex[t_{in}/2][p],$$

where p is an element from a tuple of pi and $t_{in}$ is tessellation factor of the inner boundary of the ring.

For output triangles that are connected to the inner boundary of the ring (i.e., two corners of the output triangle lie on the inner edge of the ring) the three vertex indices of the ith output triangle are determined by:

$$t0=InsidePointIndex[t_{in}/2][p][1],$$

where $$p=InsidePointIndex[t_{in}/2][i][2].$$

The next vertex index is determined from the first vertex index:

$$t1=t0+1$$

The third and final vertex index, is determined by:

$$t2=pi[0]+pi[1],$$

where $$pi=OutsidePointIndex[t_o/2][p].$$

Thus, [t0, t1, tr(1)+t2] provides for the absolute indices for the output triangle.

Each new output triangle may be calculated independently, without the knowledge of the other triangles in the ring. This independence enables parallel processing.

Figure 10:
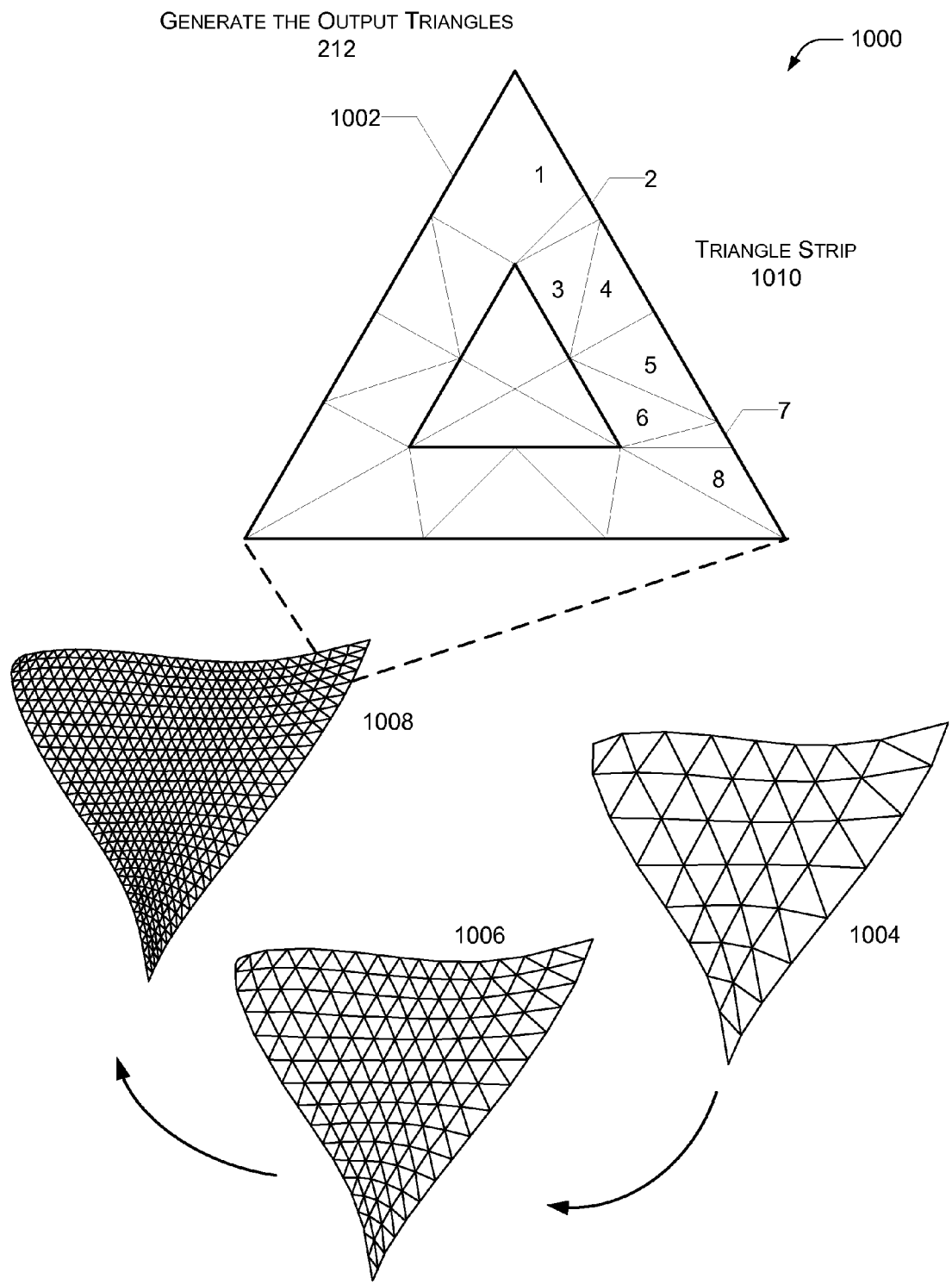
FIG. 10 is a schematic diagram of an illustrative 3-D shape after tessellation into small triangles from the process of FIG. 2.

FIG. 10 shows a schematic 1000 of an illustrative input triangle 1002 divided into multiple output triangles generated by process 200 of FIG. 2. The ultimate output of the input triangle tessellated into multiple output triangles may be rendered on a display device such as a computer monitor.

For example, the input triangle 1002 may form a part of a Bézier surface. A coarse 3D image of the Bézier surface 1004 may be represented by relatively large triangles. A first round of tessellation may create a more detailed image 1006. Subsequent tessellation may produce an image with smaller triangles 1008, which more closely approximates a smooth surface. The tessellation algorithm contained in this disclosure may be repeated an infinite number of times generating subsequent iterations with smaller and smaller triangles. Rapid generation of this Bézier surface this is enhanced by the ability to process each input triangle and generate each output triangle in parallel.

This process may be applied to many types of computer graphics applications which require rapid generation and display of 2-D or 3-D images. The output may be generated as a triangle strip 1010. For example, the triangle strip 110 may include triangles 1, 2, 3, 4, 5, 6, 7, and 8. In the triangle strip 1010 each triangles shares one edge with the previous triangle in the strip. For example, triangle 2 shares in edge with triangle 1, and thus, definition of triangle 2 requires only one additional vertex beyond the vertices defined for triangle 1. Producing the output as a triangle strip may reduce memory consumption and increase processing speed. A tessellated triangle 1002 may be described by several triangle strips.

Illustrative Computing Device

Figure 11:
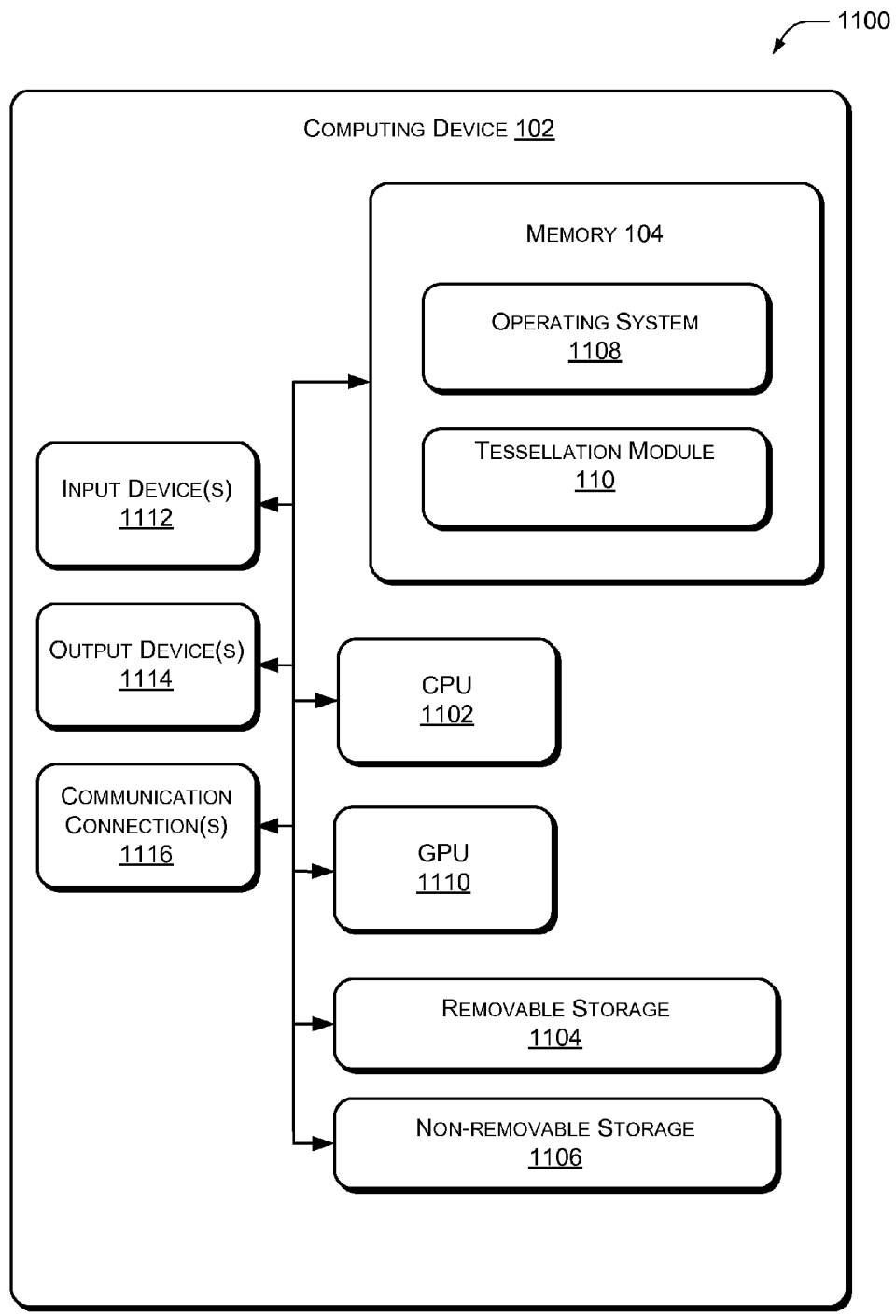
FIG. 11 is a block diagram of an illustrative computing device.

FIG. 11 is a block diagram 1100 showing an illustrative computing device 102 for tessellating triangles and computer graphics. The computing device 102 may be configured as any suitable system capable of tessellating triangles. In one illustrative configuration, the computing device wanted to comprises at least a central processing unit (CPU) 1102 and a memory 104. The CPU 1102 may be implemented as appropriate in hardware, software, firmware, or combinations thereof. Software or firmware implementations of the CPU 1102 may include computer- or machine-executable instructions written in any suitable programming language to perform the various functions described.

For example, the computing device 102 illustrates architecture of these components residing on one system. Alternatively, these components may reside in multiple other locations, servers, or systems. For instance, all of the components may exist on a server side accessed remotely by a user through a remote terminal. Furthermore, two or more of the illustrated components may combine to form a single component at a single location. The illustrated components may also reside in a computing device without a connection to a network, such as a stand-alone database.

Memory 104 may store programs of instructions that are loadable and executable on the CPU 1102, as well as data generated during the execution of these programs. Depending on the configuration and type of computing device 102, memory 104 may be volatile (such as RAM) and/or non-volatile (such as ROM, flash memory, etc.). The computing device 102 may also include additional removable storage 1104 and/or non-removable storage 1106 including, but not limited to, magnetic storage, optical disks, and/or tape storage. The disk drives and their associated computer-readable media may provide non-volatile storage of computer readable instructions, data structures, program modules, and other data.

Computer-readable storage media includes volatile and nonvolatile, removable and non-removable media implemented in any method or technology for storage of information such as computer readable instructions, data structures, program modules or other data. Memory 104, removable storage 1104, and non-removable storage 1106 are all examples of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the computing device 102.

Turning to the contents of the memory 104 in more detail, the memory 104 may include an operating system 1108 and a tessellation module 110. As discussed above, the tessellation module 110 controls tessellation a triangles for generating computer graphics. Instructions stored in the tessellation module 110 may be executed by the CPU 1102 and/or a separate graphics processing unit (GPU) 1110. In some implementations the GPU 1110 may be located on a graphics or video card in the computing device 102.

The computing device 102 may also include input device(s) 1112 such as a keyboard, mouse, pen, voice input device, touch input device, stylus, and the like, and output device(s) 1114 such as a display, monitor, speakers, printer, etc. The computing device 102 may also contain a communication connection(s) 1116 that allows the device to communicate with other devices such as servers and/or user terminals. Communication connection(s) 1116 is an example of a mechanism for receiving and sending communication media. Communication media typically embodies computer readable instructions, data structures, and program modules. By way of example, and not limitation, communication media includes wired media such as a wired network or direct-wired connection, and wireless media such as acoustic, RF, infrared and other wireless media.

The subject matter described above may be implemented in hardware, software, or in both hardware and software. Although implementations of resource access with a principal operating system-based browser have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations of controlling access to resources. For example, the methodological acts need not be performed in the order or combinations described herein, and may be performed in any combination of one or more acts.

What is claimed is:

1. A method for tessellating triangles implemented by a computing device to execute instructions that, when executed on a processor, perform acts comprising:

receiving an input triangle that has a left tessellation factor, a right tessellation factor, a bottom tessellation factor, an inside tessellation factor, and a maximum tessellation factor;

calculating a number of rings in the input triangle;

calculating a number of new vertices of output triangles in the input triangle based at least in part on the left tessellation factor, the right tessellation factor, the bottom tessellation factor, the inside tessellation factor, and the number of rings, wherein the calculating the number of new vertices is performed in parallel on the processor;

calculating a number of output triangles in the input triangle based at least in part on the left tessellation factor, the right tessellation factor, the bottom tessellation factor, the inside tessellation factor, and the number of rings, wherein the calculating the number of output triangles is performed in parallel on the processor;

computing a prefix sum of the number of output triangle vertices and the number of output triangles by using a parallel scan algorithm;

generating a new vertex for each of the output triangle vertices, the generating comprising computing a barycentric coordinate for the new vertex;

building a topology of the output triangles by generating vertex indices for the output-triangles in parallel, the generating comprising:

identifying a topology of an output triangle;

when the topology of the output triangle is regular, calculating the vertex indices for the output triangle; and when the topology of the output triangle is irregular, using two-dimensional lookup tables based on the maximum tessellation factor to determine the vertex indices for the one of the output triangles, one dimension of the two-dimensional look-up tables comprising a tessellation factor and a second dimension of the two-dimensional look-up tables comprising an index of the triangles; and outputting the computed barycentric coordinate and the generated vertex indices for generating a computer graphics display.

2. The method of claim 1, wherein the method is repeated with the output triangle serving as the input triangle for a generation of subsequent output triangles.

3. The method of claim 1, wherein the receiving of the input triangle comprises being received from a system call.

4. The method of claim 1, wherein the calculating the number of new vertices comprises:

$$nv(f_l) + nv(f_r) + nv(f_b) + 3 * \sum_{f=f_i-2}^{0} nv(f),$$

where $nv(f)=\lceil f/2 \rceil *2+1$, and $f_l$, $f_r$, $f_b$, and $f_i$ correspond to the left tessellation factor, the right tessellation factor, the bottom tessellation factor, and the inside tessellation factor, respectively.

5. The method of claim 1, wherein the calculating the number of output triangles comprises:

$$nt(f_l, f_i) + nt(f_r, f_i) + nt(f_b, f_i) + 3 * \sum_{f=f_i-2}^{0} nt(f, f),$$

where $nt(f_{out}, f_{in})=2*(\lceil f_{out}/2 \rceil + \lceil (f_{in}-2)/2 \rceil)$, and $f_l$, $f_r$, $f_b$, and $f_i$ correspond to the left tessellation factor, the right tessellation factor, the bottom tessellation factor, and the inside tessellation factor, respectively.

6. The method of claim 1, wherein the parallel scan algorithm comprises a work-efficient algorithm including an up-sweep pass and a down-sweep pass to compute the prefix sum.

7. The method of claim 1, wherein the calculating the number of vertices of output triangles in the input triangle comprises:
    summing a number of vertices on an outer level boundary edge of the input triangle with a number of vertices on a first level inner boundary edge of the input triangle; and
    summing a number of output triangles between the outer level boundary edge and the first level inner boundary edge of the input triangle with a number of output triangles between the first level inner boundary edge and a second level inner boundary edge.

8. A method for tessellating triangles implemented by a computing device to execute instructions that, when executed on a processor, perform acts comprising:
    receiving an input triangle;
    calculating a number of tessellated vertices and a number of output triangles for the input triangle, the calculating the number of tessellated vertices and the number of output triangles;
    building a topology of the output triangles by:
        determining an index of an output triangle in the input triangle;
        determining a ring of the input triangle that the output triangles is in;
        determining an edge of the input triangles that output triangles lies on;
        calculating an offset for the output triangle;
        determining a segment on the edge that is connected to the output triangle;
        identifying a topology of the output triangle;
        when the topology is regular, calculating vertex indices for the output triangle; and
        when the topology is irregular, using two-dimensional lookup tables based on a maximum tessellation factor of the input triangle to determine the vertex indices for the output triangle, one dimension of the two-dimensional look-up tables comprising a tessellation factor and a second dimension of the two-dimensional look-up tables comprising an index of the triangles; and
    generating the output triangles for rendering on a display device.

9. The method of claim 8, further comprising:
    calculating a number of vertices of output triangles in the input triangle; and
    generating a new vertex for each of the output triangle vertices.

10. The method of claim 8, wherein the two-dimensional lookup tables are computed prior to calculating the number of tessellated vertices and the number of output triangles, the lookup tables computed by:
    generating a FinalPointPosition table based on the maximum tessellation factor, the FinalPointPosition table comprising MF/2+1 elements, where MF is the maximum tessellation factor, a first element of the table comprises zero, a second element of the table comprises MF/2, and remaining elements of the table are computed through an inorder traversal of a binary tree; and
    generating arrays of tuples representing the two-dimensional lookup tables based on the FinalPointPosition table, a tuple in the two-dimensional lookup tables comprising:
        a first tuple element indicating whether an index is to be increased;
        a second tuple element comprising a prefix sum scan of the first tuple element; and
        a third tuple element indicating a compact result of the first tuple element.

11. The method of claim 10, wherein the remaining elements of the FinalPointPosition table are calculated by solving:

$$\mod((i-2)-(2^{level}-1), 2^{level+1})=0$$

for a level variable, where i is an element in the FinalPointPosition table, and a value of the element i is calculated by:

$$(MF/2+((i-2)-(2^{level}-1)))/2^{level+1},$$

where MF is the maximum tessellation factor.

12. The method of claim 8, wherein the calculating vertex indices for the output triangle is based on the segment, the edge, the ring, and the offset corresponding to the output triangle.

13. The method of claim 8, wherein the building the topology of the output triangles is executed in parallel for at least two output triangles.

14. One or more computer-readable storage devices having computer-readable instructions thereon which, when executed by a processor, instruct a computing device to perform acts comprising:
    receiving an input triangle;
    calculating a number of output triangle vertices in the input triangle;
    generating a new vertex for each of the output triangle vertices, the generating comprising:
        determining a ring of the input triangle that the new vertex is in;
        determining an edge of the input triangle that the new vertex lies on;
        determining an offset for the new vertex;
        computing a barycentric coordinate for the new vertex; and
    generating the output triangles for real-time rendering of a computer-generated graphic.

15. The computer-readable storage devices of claim 14, further comprising building a topology of output triangles.

16. The computer-readable storage devices of claim 14, wherein the determining a ring of the input triangle comprises:
when the index of the new vertex is less than a number of vertices on an outer boundary edge of the input triangle; and
when the index of the new vertex is equal to or greater than the number of vertices on the outer boundary edge of the input triangle, the ring that the new vertex is in is calculated by:

$$vr(\text{ring}) = nv(f_l) + nv(f_r) + nv(f_b) + 3 * \sum_{r=1}^{ring-1} nv(f_i - r*2),$$

where vr(ring) is the ring of the new vertex, ring corresponds to the ring number, $f_l$, $f_r$, $f_b$, and $f_i$ correspond to the left tessellation factor, the right tessellation factor, the bottom tessellation factor, and the inside tessellation factor, respectively, nv is a number of new vertices, and the ring is calculated by solving:

vr(ring)<the index of the new vertex<vr(ring+1).

17. The computer-readable storage devices of claim 14, wherein the determining an edge of the input triangle is determined based on the ring of the input triangle that the new vertex is in:
when the ring is ring-zero and:
when the index of the new vertex is less than a number of vertices of a left edge of ring-zero, the edge is 0;
when the index of the new vertex is greater than or equal to the number of vertices of the left edge of ring-zero and a difference between the index of the new vertex and the number of vertices of the left edge of ring-zero is less than a number of vertices of a right edge of ring-zero, the edge is 1;
when neither of the above conditions are true, the edge is 2; and
when the ring is not ring-zero, the edge is calculated by:

(vi−vr(ring))/nv(f_i−ring*2), where vi is the index of the new vertex, vr(ring) is the ring of the new vertex, f corresponds to the inside tessellation factor, and nv is a number of new vertices.

18. The computer-readable storage devices of claim 14, wherein the determining the offset based on the ring of the input triangle that the new vertex is in:
when the ring is ring-zero and:
when the index is less than the number of vertices, the offset is an index of the new vertex; or
when the index is not less than the number of vertices, the offset is a difference between the index and the number of vertices; and
when the ring is greater than zero, the offset is calculated by:

mod((vi−vr(ring)),nv(f_i−ring*2)), where vi is the index of the new vertex, vr(ring) is the ring of the new vertex, $f_i$ corresponds to the inside tessellation factor, and nv is a number of new vertices.

19. The computer-readable storage devices of claim 14, wherein the computing of the barycentric coordinate for the new vertex comprises:
dividing the edge that the new vertex lies on into two segments;
identifying a relative position of the new vertex on a segment; and
linearly interpolating ends of the segment and the relative position of the new vertex to obtain the barycentric coordinate for the new vertex.

20. The computer-readable storage devices of claim 14, wherein the generating the new vertex for each of the output triangle vertices is executed in parallel for at least two output triangles.

* * * * *